US011015981B2

(12) United States Patent
Fernández Valdivia et al.

(10) Patent No.: US 11,015,981 B2
(45) Date of Patent: May 25, 2021

(54) METHOD AND OPTICAL SYSTEM FOR ACQUIRING THE TOMOGRAPHICAL DISTRIBUTION OF WAVE FRONTS OF ELECTROMAGNETIC FIELDS

(71) Applicant: Wooptix S.L., Madrid (ES)

(72) Inventors: Juan José Fernández Valdivia, Santa Cruz de Tenerife (ES); Juan Manuel Trujillo Sevilla, Santa Cruz de Tenerife (ES); Óscar Gómez Cárdenes, Santa Cruz de Tenerife (ES)

(73) Assignee: Wooptix S.L., La Laguna (ES)

( * ) Notice: Subject to any disclaimer, the term of this patent is extended or adjusted under 35 U.S.C. 154(b) by 11 days.

(21) Appl. No.: 16/483,385

(22) PCT Filed: Feb. 1, 2018

(86) PCT No.: PCT/EP2018/052533
§ 371 (c)(1),
(2) Date: Aug. 2, 2019

(87) PCT Pub. No.: WO2018/141853
PCT Pub. Date: Aug. 9, 2018

(65) Prior Publication Data
US 2020/0011738 A1    Jan. 9, 2020

(30) Foreign Application Priority Data

Feb. 3, 2017 (EP) .................................. 17382047

(51) Int. Cl.
*G01J 9/00* (2006.01)

(52) U.S. Cl.
CPC ........... *G01J 9/00* (2013.01); *G01J 2009/002* (2013.01)

(58) Field of Classification Search
CPC ............................. G01J 2009/002; G01J 9/00
See application file for complete search history.

(56) References Cited

U.S. PATENT DOCUMENTS

| 5,454,004 A * | 9/1995 | Leger | G02B 5/1871 372/102 |
| 8,907,260 B2 * | 12/2014 | Restaino | G02B 26/06 250/201.9 |
| 2005/0007603 A1 | 1/2005 | Arieli et al. | |
| 2011/0032337 A1 * | 2/2011 | Rodriguez Ramos | G06T 7/557 348/49 |
| 2011/0292363 A1 * | 12/2011 | Ivey | G03F 7/70158 355/55 |
| 2016/0000319 A1 | 1/2016 | Kumar et al. | |

OTHER PUBLICATIONS

Office Action dated Apr. 27, 2020 in connection with Russian Patent Application No. 2019126068/28, 14 pages.
(Continued)

*Primary Examiner* — Michael P LaPage

(57) ABSTRACT

The invention relates to a method for the two-dimensional reconstruction of wave fronts (104) of light for use in an optical system (100) comprising: measuring the distribution function of the light intensity in at least two images at different optical planes (101, 102) having an optical path difference. In particular this method is suitable for probing the tomographical distribution of wave fronts of electromagnetic fields with an image detector, e.g. any standard two-dimensional camera.

18 Claims, 3 Drawing Sheets

(56) References Cited

OTHER PUBLICATIONS

Figure 1:
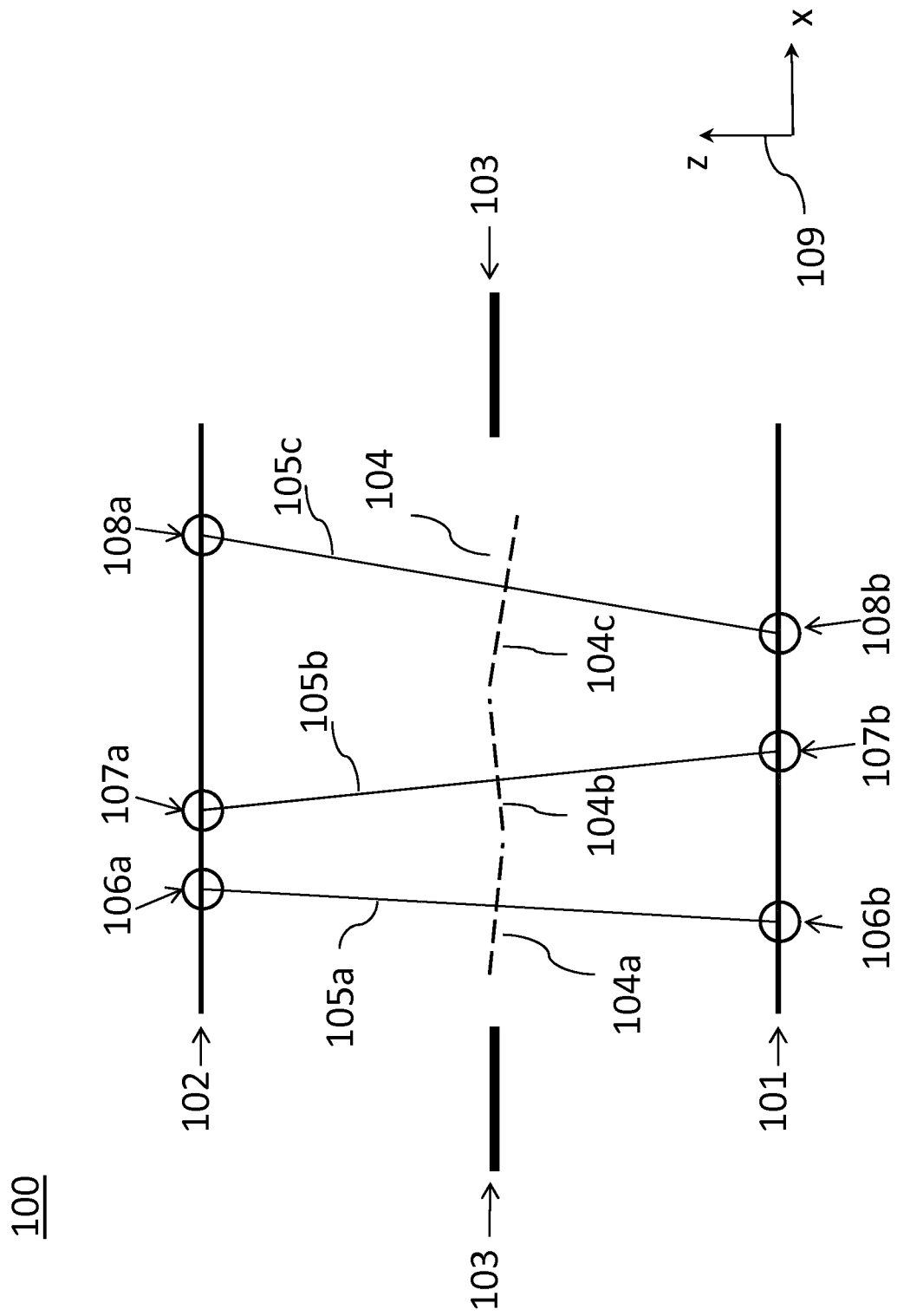

J.J. Fernandez-Valdivia, et al., "Real time phase compensation using a Tomographical Pupil Image Wavefront Sensor (TPI-WFS)", 2016 IEEE 15th Workshop on Information Optics, Jul. 11, 2016, 2 pages.
Saloni Pal, et al., "Practical application of the geometric wavefront sensor for adaptive optics", 2016 International Conference on Image and Vision Computing, Nov. 1, 2016, 6 pages.
Marcos A. van Dam, et al., "Wave-front sensing from defocused images by use of wave-front slopes", Applied Optics, vol. 41, No. 26, Sep. 10, 2002, 6 pages.
Roberto L. Lopez, et al., "An instrumental puzzle: the modular integration of AOLI", Aug. 16, 2016, 10 pages.
European Search Report dated Jul. 27, 2017 in connection with European Patent Application No. 17 38 2047, 2 pages.
International Search Report dated Mar. 27, 2018 in connection with International Patent Application No. PCT/EP2018/052533, 2 pages.
Written Opinion of the International Searching Authority dated Mar. 27, 2018 in connection with International Patent Application No. PCT/EP2018/052533, 7 pages.

\* cited by examiner

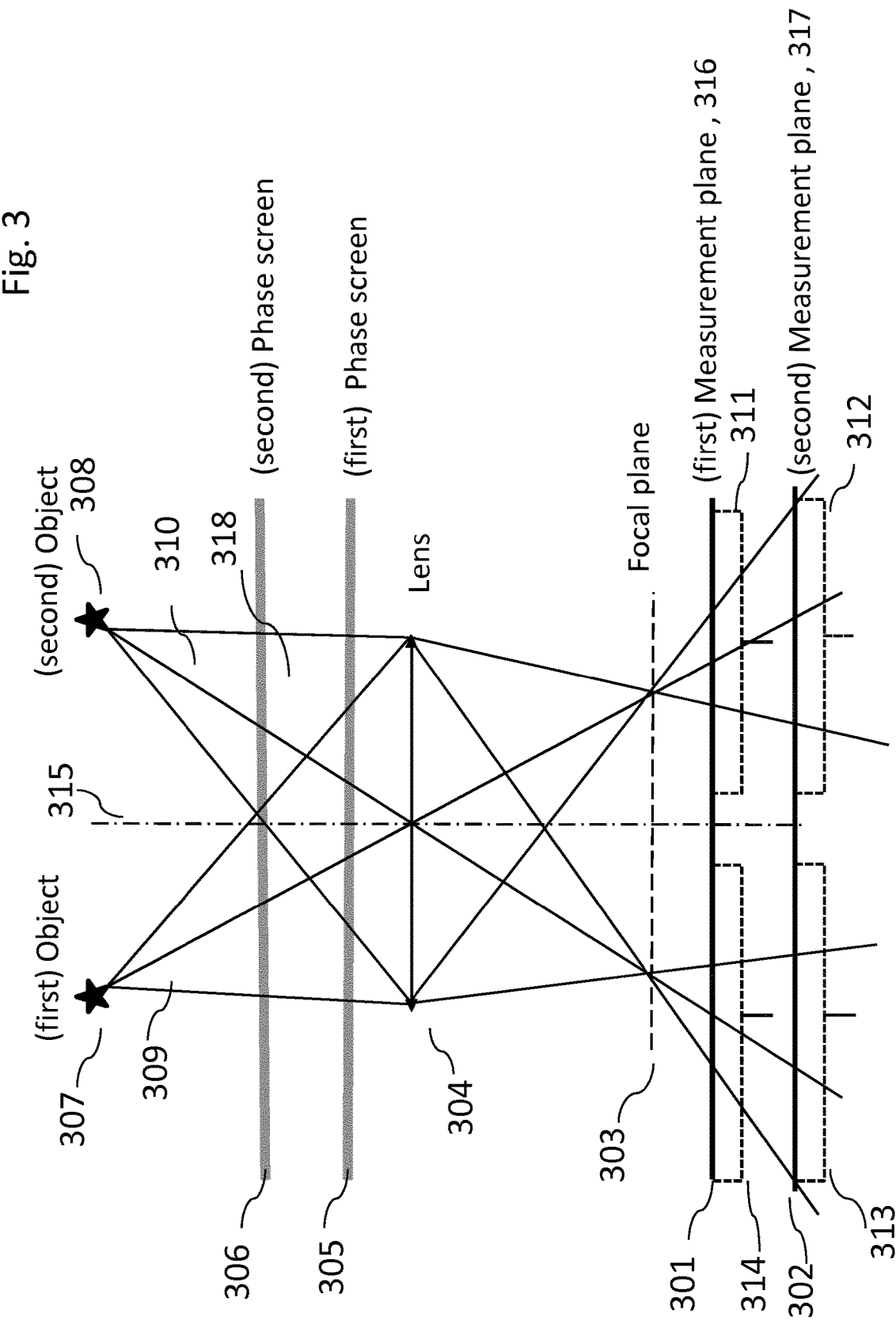

METHOD AND OPTICAL SYSTEM FOR ACQUIRING THE TOMOGRAPHICAL DISTRIBUTION OF WAVE FRONTS OF ELECTROMAGNETIC FIELDS

CROSS-REFERENCE TO RELATED APPLICATIONS

This application is a 371 National Stage of International Application No. PCT/EP2018/052533 filed on Feb. 1, 2018, which claims priority to European Patent Application No. 17382047.3 filed Feb. 3, 2017, the disclosures of which are incorporated herein by reference.

STATE OF THE ART

The invention relates to a method of the type as specified in the preamble of patent claim 1, a computer system as specified in the preamble of patent claim 10, and a storage media as specified in the preamble of patent claim 17.

When an electromagnetic wave passes through an inhomogeneous medium, its wave front gets distorted or deformed with respect to its original shape. Said wave-front distortions can lead to aberrations in an optical system, thereby degrading the performance of the optical system.

For example, in ground-based astronomical imaging with a telescope, light wave-fronts from distant astronomical observing targets get distorted due to interactions with the turbulent Earth's atmosphere as well as due to interactions with optical elements, e.g. lenses or mirrors, of the telescope, thereby leading to degraded images.

However, also the performance of optical systems from other technical fields, such as, for example, photography, medical imaging, e.g. tomography in tissues or microscopy, is adversely affected by wave-front distortions occurring along the optical path due to the interaction of the wave fronts with inhomogeneous media.

To correct for such wave-front deformations or aberrations and to reconstruct the original shape of the wave front, inter alia, adaptive optic systems are used, that aim to measure the wave-front deformations or aberrations via so-called wave-front sensors.

Typical examples for such wave-front sensors include Shack-Hartmann sensors, pyramidal sensors, shearing interferometry and curvature sensors.

The drawback of known wave-front sensors is that they are technically complex and, for example, can comprise themselves a plurality of optical elements, e.g. a plurality of lenses. Furthermore, the analysis of the data generated by these wave-front sensors in order to reconstruct the original wave front is computationally resource intensive and challenging.

Problem

It is therefore the object of the present invention to provide improved means for wave-front reconstructions in an optical system. In particular, for example, an aim of the present invention is to simplify and to speed up the measurement of the wave-front distortions, in particular speeding up the estimation of wave-front slopes, as well as to facilitate and accelerate the reconstruction of the original wave front, i.e. the reconstruction of the original wave-front shape.

Solution

According to the present invention, this object is achieved by a method according to claim 1, a computer system according to claim 10, and a storage media according to claim 17.

Advantageous embodiments and further developments are the subject matter of the subclaims.

An exemplary method for the two-dimensional reconstruction of wave fronts, optical light wave fronts, for use in an optical system may comprise one, some, or all of the following steps.

measuring the distribution function of the light intensity, e.g. the two-dimensional distribution function of the light intensity, in at least two images at different optical planes having an optical path difference, said measuring comprising, determining a plurality of one-dimensional cumulative distribution functions of the light intensities in each plane over a range of different angles within each plane, and matching the determined one-dimensional cumulative distribution functions of the different optical planes to derive two-dimensional wave-front slopes estimates in a plane, e.g. the midway plane, located between said different optical planes, and integrating said wave-front slopes estimates to reconstruct the two-dimensional shape of the wave front in said plane located between said different optical planes.

Exemplary optical systems or optical acquisition system can thereby comprise digital cameras, e.g. common two-dimensional camera, telescopes, microscopes, integral display and other imaging systems.

In particular, the images taken at different optical planes of the optical system can, for example, be captured by a charge-coupled device (CCD).

Herein the term of measuring the distribution function of the light intensity in an image, e.g. the two-dimensional distribution function of the light intensity in an image, can inter alia also be understood as determining the distribution function of the light intensity, e.g. the two-dimensional distribution function of the light intensity, from known characteristics of the optical plane of the image. For example, if a pupil of the optical system is sufficiently well characterized, for example, by a pupil function, the distribution function of the light intensity in the pupil plane can be determined directly from the parameters of the optical system.

Moreover, since in such exemplary case, the pupil plane image remains the same independently of the passing wave front, the pupil image, i.e. the distribution function of the light intensity in the pupil plane, need only be determined or estimated once.

Furthermore, the matching of the determined one-dimensional cumulative distribution functions of the different optical planes, can for example be performed by pair-wise matching of one-dimensional cumulative distribution functions of the different optical planes using a metric or distance function that measures the distance between the determined one-dimensional cumulative distribution functions along a straight line or along an axis, e.g. the abscissa, at the same values of the distance function.

It is noted that herein the propagation of wavefronts, i.e. electromagnetic wave fronts, or photons is assumed to follow the laws of geometrical optics, i.e. it is, for example, assumed that the direction of propagation is perpendicular to the wave front. For completeness, it is noted that the wave front can be defined by the set of points of a wave having the same phase, i.e. the wave front or wave-front shape can be described by a phase map, e.g. a two-dimensional phase map.

Furthermore, it is assumed that the distribution function of the light intensity of a propagated wave front can be represented by a probability density function (PDF) for the probability of photon arrival. It is further assumed, that the wave-front propagation conserves the flux, i.e. that the total area under the one-dimensional PDF curve remains constant.

It is further noted, that the optical plane in which the wave front is to be reconstructed can be located at any place along the optical path of the optical system. In other words the optical plane in which the wave front is to be reconstructed does not need to coincide with any specific optical plane, e.g. aperture plane or pupil plane, of the optical system.

In particular it is, for example, conceivable that the images taken at different optical planes having an optical path difference, i.e. the images wherein the distribution function of the light intensity is measured, can be located both before or after an aperture or pupil plane of the optical system, such that the optical plane in which the wave front is to be reconstructed also can be located before or after or behind an aperture or pupil plane of the optical system.

It is also possible, that the images taken at different optical planes having an optical path difference, i.e. the images wherein the distribution function of the light intensity is measured, can be located at different distances with respect to a possible aperture plane or pupil plane.

The method exemplary described above, provides a more efficient and faster manner to estimate two-dimensional wave-front slopes and to recover the two-dimensional original shape of a wave front from said two-dimensional wave-front slopes estimates derived from data from wave-front sensors or derived from, for example, pairs of images having an optical path difference, respectively. In particular, the method presented can more efficiently recover the original shape of a wave front or original phase of a wave front, wherein the wave-front variations or light intensity variations occur in two dimensions, i.e. along different directions.

In addition, according to the present invention, for example, resolutions of the wavefront along the optical path, e.g. along the z-axis, with images taken in the xy-plane and having an optical path difference, down to a few picometers can be achieved.

Compared to known techniques, which besides, inter alia, require intricate wave-front sensor designs involving a multitude of optical elements and that also require difficult and cumbersome integration techniques and wave-front parametrizations, e.g. using Zernike polynomials or Radon transformations, the method presented here dispenses with such computational intensive techniques and parametrizations, thereby significantly facilitating the wave-front reconstruction, in particular, with respect to the speed with which a wavefront to be recovered can be calculated. In other words, the method overcomes the current technical prejudice, that precise two-dimensional wave-front reconstruction requires computational resource intensive and intricate wave-front parametrizations and transformations.

Due to the increase of its computational efficiency the method is suited, for example, to be applied in real time, for example, in controlling a feedback loop in an adaptive optics system.

Furthermore, the reduced computational burden, allows also implementing the method described above on common computer processor units (CPUs) or common graphical processor units (GPUs) that can be found in smart phones, digital cameras, tablets, laptops, desktops, and other common electronic devices.

Another advantageous effect of the method described herein is that no additional spatial or temporal modulations are added to wavefront to be measures, as there is no need for extra optical elements for measuring or sensing the wavefront, as is the case for example in wavefront sensing with wavefront sensors, such as, for example, Shack-Hartmann sensors or pyramidal sensors.

Said determining of a plurality of one-dimensional cumulative distribution functions of the light intensities in each plane over a range of different angles within each plane can be, inter alia, understood as determining of a plurality of one-dimensional cumulative distribution functions of the light intensities in each plane over a range of different directions, i.e. over a range of different straight lines or at least one straight line within each plane, wherein said straight lines each have a slope that can be characterized by an angle.

Stated differently, said possible angles within each plane can define slopes for straight lines in each plane along which the one-dimensional cumulative distribution function(s) of the light intensity in each plane can be determined.

A possible range of different angles within each plane defining the slopes of said straight lines in each plane for determining a plurality of one-dimensional cumulative distribution functions of the light intensity in each plane can, for example, comprise at least two different angles in each plane, for examples two orthogonal angles, e.g. 0° and 90°.

It is also possible that the angles or straight lines along which the one-dimensional cumulative distribution functions of the light intensity in each plane can be determined, are matched to assumed predominant directions or axes of the wave front or wave-front variations.

However, it is also conceivable, that, when assuming a wave-front variation occurs only at a specific angle or specific direction, a one-dimensional cumulative distribution function for only said specific angle or specific direction is determined to recover the original wave-front shape or wave-front phase.

Moreover, the exemplary steps described above can provide a basis to perform a tomography of the three-dimensional distribution, i.e. the volumetric distribution, of the wave fronts of electromagnetic fields, e.g. the three-dimensional distribution of wave fronts along the optical axis of an optical system, e.g. over a stack of images. In other words the method presented herein allows can for example allow to derive the three-dimensional distribution of wave fronts along the optical axis of an optical system from a stack or series of reconstructed two-dimensional wavefronts. In particular, the method described herein provides a computational faster and more efficient ways to carry out said tomography of the three-dimensional distribution of the wave fronts of electromagnetic fields as compared to current wave-front tomography methods.

In the exemplary method steps described above, one of the at least two images can be taken, for example in a pupil plane, e.g. exit pupil plane, or an aperture plane of the optical system.

The possible exemplary step of taking an image in the pupil plane can also be understood as characterizing an image in the pupil plane based on a well defined characterizing model of the pupil of the optical system. Stated differently, one of the at least two images can be an image that can be fully characterized by theoretical and/or empirical models. In other words such a characterized image can be computed and does not need to be captured or measured by a camera.

This has, as already mentioned above, the advantage, that the determination of the plurality of one-dimensional cumulative distribution functions in the pupil plane or aperture plane can be based upon or derived from a sufficiently well defined model of the pupil or aperture, i.e. a well defined and/or well characterized pupil function or aperture function.

It is further possible that at least one image can be taken out of focus, i.e. in a defocused plane of the optical system.

In particular, it is conceivable that one image is taken intra-focal or pre-focal and one image extra-focal or post-focal, i.e. one image before the focal plane and one image beyond the focal plane of the optical system. In other words, both of the at least two images can be defocused.

It is also possible that all taken images are out of focus, i.e. all images can be defocused.

However, it is also possible that some or all of the images from different optical planes can be focused.

Furthermore, it is noted that the method described herein also can be applied in afocal optical systems, i.e. optical systems without a focus. It is merely required that there is an optical path difference between the measured or determined images.

Any optical path difference between the measured or determined images can be used. For example, a fraction or the total length of the optical system can be used as optical path difference. Thereby the size or length of the optical path difference can determine the resolution with which the wave-front slope estimate or wave-front shape or wave-front phase can be determined. In particular increasing the optical path difference, i.e. increasing the distance between optical planes between the measured or determined images can increase the wave-front phase resolution or wave-front shape resolution of the wave front to be recovered.

As mentioned above, the method described herein can inter alia provide a tomography of the three-dimensional distribution, i.e. the volumetric distribution, of the wave fronts of electromagnetic fields, e.g. the three-dimensional distribution of wave fronts along the optical axis of an optical system. The basis for deriving such phase or wave-front tomography can be provided by the images taken at different optical planes having an optical path difference, and wherein, for example, said images are taken by an image detector with a charge-coupled device (CCD), e.g. a common two-dimensional digital camera. Hence said images can provide the basis for providing a tomographical measure of the three-dimensional wave-front phase distribution.

It is in other words, for example, possible, that a plurality of images, e.g. more than two images, are taken at different optical planes to reconstruct a plurality two-dimensional wave-front shapes at a plurality of optical planes.

This, for example, advantageously allows carrying out an above-mentioned phase or wave-front tomography to view an imaged object from different points of view, while maintaining the two-dimensional resolution of the image.

Alternatively, or in addition, wave-front phase tomography can be performed on the basis of estimating the wave-front phase or estimating the wave-front slope(s) not over the whole size of the measured or determined images, but instead from estimating the wave-front phase or estimating the wave-front slope(s) over only parts or sections of the measured or determined images.

Stated differently an exemplary three-dimensional wave-front phase distribution or tomography can be derived from a plurality images, e.g. more than two images, taken at different optical planes, e.g. at optical path positions, to reconstruct a plurality two-dimensional wave-front shapes at a plurality of optical planes probing the three-dimensional wave-front phase distribution and/or an exemplary three-dimensional wave-front phase distribution or tomography can be derived from by a plurality of two-dimensional wave fronts reconstructed from different parts or sections of the measured or determined images for a given optical plane.

Hence, images can be divided into sections, wherein the two-dimensional shape of the wave front is reconstructed for each section. To be more precise the two-dimensional wave front(s) or wave-front phases can be reconstructed in sections of a plane, e.g. midways plane, located between the sections from the different optical planes in which the images are measured or determined.

Since light or light rays emanating or scattered from different parts and/or different depths of an object to be observed (or light or light rays emanating or scattered from different objects) will hit the image plane of the measured or determined images at different angles or locations, i.e. can form images at different locations in the optical plane of the measured or determined images, different regions of the measured or determined images can be mapped back to different parts or different depths of the object to be observed (or to parts of different objects).

Stated differently, by computing or restoring wave-fronts or wave-front phases for different regions or parts of the measured or determined images, different viewing angles for the object(s) to be observed can be obtained.

In other words, the method described herein, can be applied on a plurality of different parts or subsections of the measured or determined images to restore the wave-fronts originating from different parts or different depths of an object to be observed or from different objects of from parts of different objects.

Hence, the method described herein can exemplary comprise one, some, or all of the following steps:

measuring the distribution function of the light intensity in at least two different sections of at least two images at different optical planes having an optical path difference, wherein said measuring can comprise, determining a plurality of one-dimensional cumulative distribution functions of the light intensity in each section over a range of different angles within each section, matching the determined one-dimensional cumulative distribution functions of the different sections from different optical planes to derive two-dimensional wave-front slopes estimates in sections of a plane, e.g. the midway plane, located between said different optical planes, and integrating said wave-front slopes estimates to reconstruct the two-dimensional shape of the wave front(s) in the sections of said plane located between said different optical planes.

For a possible exemplary distribution of a plurality of measured or determined images and a possible plurality of selected phase screens, that are assumed to impart to the wave front(s) of the object(s) to be observed a phase change that is equivalent to the phase change within the region or parts of the object it represents, said possible phase screens can be computed from the recovered or determined wave-front phases from the said plurality of sections or regions the measured or determined images can be partitioned into.

Assuming, for example, that the object(s) or target media to be observed is at least partially transparent, said object(s)

or target media can be modeled as a set of discrete phase screens which are distributed along the optical axis, e.g. z-axis, and wherein said set of phase screens can be computed or restored based on the plurality of sections or regions the measured or determined images can be partitioned into.

Herein a phase screen can inter alia be modeled by the complex expression $e^{-j\varphi}$, wherein $\varphi$ is the two-dimensional phase map for a given phase screen and j is the imaginary number.

When, for example, a wave front, i.e. an electromagnetic field U, passes through a phase screen, the resulting field or wave front will have the shape or form $U*e^{-j\varphi}$.

From a computational point of view a phase screen can be modeled by a matrix wherein the different matrix elements represent different phase change values. As mentioned before, an at least partially transparent object or target volume can then be modeled as a set or stack of phase screens.

By dividing the measured or determined images into a plurality of sections or regions, said plurality of sections or regions can, for example, be understood as capturing a projection (or line integral) of the at least partially transparent object or target volume at a certain angle.

Hence a certain section or region of the measured or determined images can correspond to the projection (or line integral) of phase screens at a certain angle.

Stated differently, the measured or determined images can be partitioned into a plurality of sections or regions which can reflect a projection or line integral of an assumed distribution of phase screens at a certain angle.

From these projections onto the plurality of sections or regions of the measured or determined images, at least one equation system can be defined from which the unknown values of said matrix elements of the phase screens can be determined.

For example and for simplicity let a phase screen be represented by the following exemplary matrix with elements x1, x2, x3, x4 representing different phase change values:

$$\begin{pmatrix} x1 & x2 \\ x3 & x4 \end{pmatrix}$$

Given the following two projections of this matrix, for example at 0° and 90° degrees, $$\begin{pmatrix} a \\ b \end{pmatrix}$$

and (c,d), with a, b, c, d representing projected phase change values, and wherein said projections are, for example, captured by two different sections or regions of a measured or determined image, the following equations or equation system can be formulated.

For the projection at 0° degrees:

$x1+x2=a$ $x3+x4=b$

For the projection at 90° degrees:

$x1+x3=c$ $x2+x4=d$

Hence, from the four equations the unknown values x1, x2, x3, x4 can be determined. This example can be extended to further matrix dimensions or sizes.

In other words, by restoring the phase screens from solving said equation system(s), a phase tomography of the object or target volume to be observed can be performed.

It is also worth noting that once the wave front is recovered, i.e. the wave front located between said different optical planes of which images have been taken, said recovered wave front can be propagated according to the principles of Rayleigh-Sommerfeld diffraction.

Thereby the light intensities in optical planes that were not captured can be simulated, and the optical system can, by only capturing two images, act as a light field camera and a tomographic phase sensor.

As indicated above, the method can be computer-implemented, i.e. a computer system can comprise at least one processor unit that is configured to carry out a method for two-dimensional reconstruction of wave fronts as described herein.

Said at least one processor unit can, for example, be a common computer processor unit (CPU) or a common graphical processor unit (GPU).

Since the method is directed to images, e.g. images that can be captured, stored and processes as pixel-based images, graphical processor units (GPUs) can be particularly well suited to carry out the method. However, last but not least due the fact that the method described here is more computational efficient than currently known techniques, it can be implemented also easily on common computer processor units (CPUs).

For example, computing times for the here presented method can be of the order of ms or less. In particular, for example, computing times with a GPU of 1.14 ms for an exemplary image size of 256×256 pixel, and of 0.73 ms for an exemplary image size of 140×140 have been obtained.

The method described herein can be implemented in computer readable instructions that can be stored on one or more computer readable storage media or in one more computer readable data files.

The images that form the basis for the herein described two-dimensional reconstruction of wave fronts in an optical plane and that optionally can also provide tomography of the three-dimensional distribution, i.e. the volumetric distribution, of the wave fronts can, for example, be captured by an image detector, e.g. a camera comprising a charge-coupled device (CCD), e.g. a common two-dimensional digital camera, of the optical system and/or by a dedicated wavefront sensor comprising a camera.

In other words an exemplary optical system can comprise at least one image detector and/or at least one wavefront sensor, and the optical system can be configured to carry out at a wavefront reconstruction and/or a tomography of the three-dimensional distribution, i.e. the volumetric distribution, of the wave fronts as described herein based on data from the at least one image detector and/or based on data from the at least one wavefront sensor.

In particular it is conceivable that the possible wavefront sensor can be a curvature sensor and/or wherein the wavefront sensor comprises an optical acquisition system, e.g. a camera comprising a charge-coupled device (CCD), e.g. a common two-dimensional digital camera.

In the following, an example for the measurement or estimation of the distribution function, e.g. two-dimensional distribution function, of the light intensity or light intensity distribution of an image taken in an optical plane of an optical system is given using an exemplary framework.

Let $f(x,y)$ be a two-dimensional probability density function (PDF) representing the two-dimensional distribution of light intensities, e.g. the two-dimensional distribution of light intensities on an image in the xy-plane captured for example, by a charge-coupled device (CCD), wherein the image has, for example, a resolution of N×M, with M, N being integers greater 1, i.e. wherein the image has a size of N×M pixel.

Let V be a transformation acting on f(x,y) and wherein the transformation V is defined as $$V(p,t)[f(x,y)] = CDF(f(x,t+px)),$$

wherein CDF represents the cumulative distribution function of $f$ along a straight line of slope p and intercept t along an image.

With the following substitution of the slope p by the angle α, i.e.

$$p = \tan(\alpha),$$

the transformation V can be expressed as:

$$V(\alpha,t)[f(x,y)] = CDF(f(x,t+x\tan(\alpha)))$$

In addition, we can denote with D(x)[a,b] a distance metric or distance function D for the distance on the x-axis of two curves a and b for the same value of x. Herein, the two curves a and b can be understood as the cumulative distribution functions CDFs of lines, i.e. lines with slopes or angles and intercept, along an image as defined above for the V transformation.

The function D(x)[a,b] can be used to determine the spatial displacement of measured photon arrival locations or photon ray positions or measured local light ray intensity positions between two images at different optical planes, wherein said spatial displacement is caused by and depends on the wave-front aberrations. In other words, the comparison of determined photon ray positions or measured local light intensities in two different images of the optical system with an optical path difference, allows to constrain the occurring wave-front aberration and allows reconstructing the original wave-front shape.

Furthermore, we assume that we have captured in an exemplary optical system two images $I_1$, $I_2$, i.e. two different light intensity distributions, at different optical planes having an optical path difference.

For simplicity, we further assume that both images have the same resolution and, for example, have both a size of M×M pixel. However, the method described herein also works with images having different resolutions or different sizes.

For both images $I_1$, $I_2$, the transformation V can be calculated for each value t∈[−tan(α)M, M] and a plurality of concrete values of the angle α.

Additionally, all resulting curves V(α, t) can be normalized between 0 and M−1.

Thus, the horizontal first derivative for the pixel (x, y) in the wave-front reconstruction plane located between the different optical planes of images $I_1$, $I_2$, can be given by:

$$\delta_x(x,y) = \cos(\alpha)D(x)[V(\alpha,y)[I_1], V(\alpha,y)[I_2]],$$

and the vertical first derivative for the pixel (x, y) in the wave-front reconstruction plane located between the different optical planes of images $I_1$, $I_2$, can be given by:

$$\delta_y(x,y) = \sin(\alpha)D(x)[V(\alpha,y)[I_1], V(\alpha,y)[I_2]]$$

Exploiting the linear relationship obtained from geometrical optics between the slope of the wavefront and the displacement of a photon, and using the equivalence of the above determined first derivatives with the local wavefront slopes, i.e. at pixel(s) (x, y) in the wave-front reconstruction plane, the two-dimensional wave front to be reconstructed in the plane located between the different optical planes of images $I_1$, $I_2$, can be obtained by integration of $\delta_x(x, y)\delta_y(x, y)$ along x and y.

Said integration of the derived wavefront slopes estimates $\delta_x(x,y)\delta_y(x,y)$ to reconstruct the two-dimensional shape of the wave front in the optical plane located between said different optical planes can, inter alia, be carried out using, for example, fast Fourier transform (FFT) algorithms, comprising for example one, some, or all of the following steps:
  performing a Fourier transform of $(\delta_x,\delta_y)$ array(s) into the Fourier (u, υ) domain
  multiplication of the Fourier transform of the $\delta_x$ slope by u and multiplication of the Fourier transform of the $\delta_y$ slope by υ
  adding the obtained arrays and divide result by $(u^2+v^2)$ except at the origin (and/or put zero at origin)
  compute inverse Fourier transform to obtain an estimate of the reconstructed wave front However, also other integration schemes can be applied.
The following figure illustrate exemplary:
FIG. 1: Exemplary optical system
FIG. 2: Exemplary plot of ray shift measurement accuracy
FIG. 3: Exemplary wave-front phase tomography configuration FIG. 1 shows an example of a simplified optical system 100 illustrating the relation between the displacement of exemplary photons 106a, 106b, 107a, 107b, 108a, 108b and the slope, i.e. the local slope, of a wave front 104 for the simplified one-dimensional case in which all wave-front and intensity variations occur in one direction only and for the exemplary case of having three detected photons, e.g. captured in an image, in each optical plane 101,102 having an optical path difference, e.g. having an optical path difference along the z-axis.

The distribution of the exemplary photons 106a, 106b, 107a, 107b, 108a, 108b in their respective planes 101,102, thereby can be interpreted as representing light intensity distributions and the optical planes 101,102 can be interpreted a different images having optical path difference.

The reference numeral 109 denotes an exemplary orientation of the optical system, with the z-axis being identical or parallel to the optical axis (not shown) of the optical system 100.

Assuming that photons 106a, 106b, 107a, 107b, 108a, 108b travel in straight lines 105a, 105b, 105c between the image planes or optical planes 102 and 101, and assuming that the direction of propagation of the photons is perpendicular to their corresponding local wave front, the displacement of the photons along the x-axis is given by the (local) wave-front slope times the distance between the two optical planes 101, 102.

Hence the local wave-front slopes 104a, 104b, 104c of the wave front 104 can be estimated or reconstructed at an optical plane 103 halfway between the position of the photons or halfway between the optical planes 102,101, respectively, by matching the photons 106b, 107b, 108b of one plane 101 onto the photons 106a, 107a, 108 of the other plane 102.

The optical planes 102,101 in which the distribution of photons, i.e. the light intensity distribution, is measured can be located at any place along the optical path of the optical system 100. Therefore, also the optical plane 103 in which the wave front is to be reconstructed can be located at any place along the optical path of the optical system 100. Stated differently, the optical plane 103 in which the wave front is to be reconstructed does not need to coincide with any specific optical plane, e.g. aperture plane or pupil plane, of the optical system 100.

As previously mentioned, it is conceivable that the images taken at different optical planes having an optical path difference, i.e. the images wherein the distribution function of the light intensity is measured, can be located both before or after an aperture or pupil plane of the optical system 100, such that the optical plane 103 in which the wave front is to be reconstructed also can be located before or after an aperture or pupil plane of the optical system 100.

It is therefore possible that the images taken at different optical planes having an optical path difference, i.e. the images wherein the distribution function of the light intensity is measured, can be located at different distances with respect to a possible aperture plane or pupil plane.

The method according to the invention described above, now allows recovering the shape of the wave front also for the more complex case in which the wave-front and intensity variations occur over two dimensions and along different directions.

Figure 2:
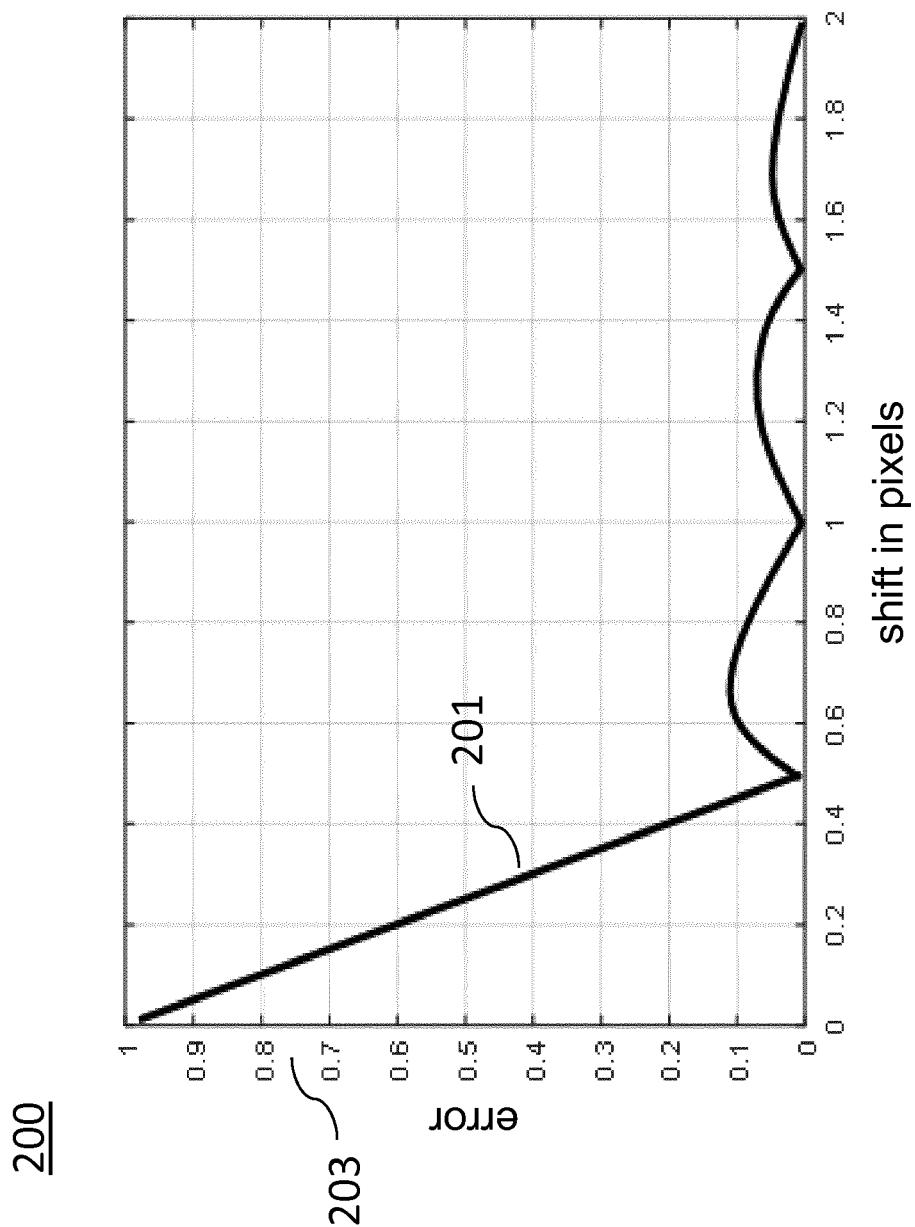

FIG. 2 exemplary shows a plot 200 illustrating an error curve 201 for the error 203 of ray position shift measurements 202, i.e. the error 203 of measuring a spatial displacement or shift 200 of ray positions or of a spatial displacement or shift 202 of measured local light intensity positions.

As mentioned above, the relation between the slope(s) of the wave-front and the spatial displacement(s) of a photon or photon ray propagating perpendicular to the wave-front can be assumed to follow a linear relationship.

The better the displacement(s) of ray positions or of measured local light intensity positions can be measure, the better the original wave-front shape or wave-front phase can be recovered.

As estimate for the achievable wave-front resolution can be given by $$\text{wave} - \text{front resolution} = \frac{p^2}{4d} [m],$$

wherein d represents the distance, i.e. the optical path difference, in m between two images on which the method presented here is carried out, and p is the pixel size in object space.

From the exemplary estimate above it can further be seen, that the achievable wave-front resolution can increase for increasing optical path difference, since a longer distance can magnify the shift(s) or displacement(s) for a given photon ray angle, e.g. the angle of propagation of the photon ray with respect to an optical axis.

In the shown present exemplary case, the error for displacements or shifts of less than 0.5 pixel is rather small, e.g. less than 10%, implying that, for example for optical path difference of a few cm, wave-front resolutions down to the picometer regime can be obtained.

For completeness we note that the minimum measureable angle or wave-front slope or wave-front phase slope can be estimated by atan (p/d), wherein d represents the distance, i.e. the optical path difference, in m between two images on which the method presented here is carried out, and p is the pixel size in the image plane or image sensor.

FIG. 3 shows an example of a simplified optical system 300 with optical axis 315 illustrating a possible exemplary configuration of the optical system 300 for wave-front phase tomography based on the sectioning or partitioning of measured or determined images 301, 302 at different optical planes or measurement planes 316, 317 having an optical path difference.

Furthermore, the exemplary optical system 300 comprises an optional optical element 304, e.g. a lens, that can, for example, focus the light rays or light ray bundles 309, 310 propagating from the exemplary objects 307, 308 to be observed onto an exemplary focal plane 303. Said exemplary objects 307, 308 can either be two distinct objects (as shown) located at different distances from the optical axis 315 or they can be different parts of a single object.

As is exemplary shown the light rays or light ray bundles 309, 310 can hit the exemplary optical planes 316, 317 at different separate locations on each plane 309, 310, i.e. at different locations of the measured or determined images 301, 303.

As described above, the measured or determined images 301, 303 can be partitioned or divided or sectioned into different sections or regions, wherein the regions or sections can be overlapping or can be separated. For example, image 301 can be partitioned into two regions 311, 314 and image 312 can be partitioned into two regions 312, 313.

Other partitioning schemes are conceivable too. The simple partitioning shown here is just illustrative. As is exemplary shown, the light rays of object 307 hit the image 301 at the region 311 of optical plane 316 and hit the image 302 at the region 312 of the optical plane 317, whereas the light rays of object 308 hit the image 302 at the region 314 of the optical plane 316 and hit the image 302 at the region 313 of the optical plane 317.

Instead of applying the herein described method for two-dimensional reconstruction of wave fronts or wave-front phases over the whole entire size of the images 301, 302 or the entire size of an image sensor, e.g. a charge-coupled device (CCD), the method reconstructing the wave front(s) or wave-front phase(s) can be applied on only the sections or regions in which each image 301, 302 or measurement plane 316, 317 or image sensor (not shown) is divided into.

In other words the wave-front phase is recovered not over the entire image 301, 302, but the wave-front phase(s) for each section 311, 314, 312, 313 or region of each image 301, 302 is/are recovered.

To be more precise, the wave-front shapes or wave-front phases of sections in a plane located between corresponding sections 311, 314, 312, 313 or regions of the images 301, 302, i.e. between the optical planes 316, 316, can be recovered.

Assuming, for example, an at least partially transparent object or target media volume 318, said least partially transparent object or target media volume 318 can be modeled as a set of different discrete phase screens 305, 306, wherein a phase screen, as mentioned above, can be modeled by a matrix wherein the different matrix elements represent different phase change values for phase changes imparted to a wave-front propagating through said at least partially transparent object or target media volume 318 by different regions of the object or target media volume.

By dividing the measured or determined images 301, 302 into a plurality of sections or regions 311, 314, 312, 313, said plurality of sections or regions can, for example, be understood as capturing a projection (or line integral) of the at least partially transparent object or target volume 318 at a certain angle.

Hence a certain section or region 311, 314, 312, 313 of the measured or determined images 301, 302 can correspond to a projection (or line integral) of a phase screen 305, 306 at a certain angle.

The partitioning of the measured or determined images 301, 302 into a plurality of sections or regions 311, 314, 312, 313 can then, as mentioned above, form the basis to define an equation system from which a plurality of phase screens 305, 306 can be computed or restored.

The set of computed or restored phase screens 305, 306 then can inter alia allow performing wave-front phase tomography of, for example at least partially transparent object(s) or target media 318 to be observed, for different parts of an object or different objects under different angles of view and/or different depths.

Followed by three sheets comprising FIG. 1, FIG. 2 and FIG. 3 and wherein the reference numerals identify the following components:

100 exemplary optical system
101 exemplary (first) image plane or (first) optical plane at a (first) optical path position having (first) light intensity distribution
102 exemplary (second) image plane or (second) optical plane at a (second) optical path position having a (second) light intensity distribution
103 exemplary optical plane, between said first and second optical plans, wherein the wave front is to be reconstructed, for example, an aperture plane of the optical system
104 exemplary wave front to be reconstructed
104a exemplary local wave-front segment having a (first) local slope
104b exemplary local wave-front segment having a (second) local slope
104c exemplary local wave-front segment having a (third) local slope
105a exemplary photon propagation trajectory/photon propagation direction/local wave-front propagation directory
105b exemplary photon propagation trajectory/photon propagation direction/local wave-front propagation directory
105c exemplary photon propagation trajectory/photon propagation direction/local wave-front propagation directory
106a exemplary photon representing a local light intensity in the optical plane 102
106b exemplary photon representing a local light intensity in the optical plane 101
107a exemplary photon representing a local light intensity in the optical plane 102
107b exemplary photon representing a local light intensity in the optical plane 101
108a exemplary photon representing a local light intensity in the optical plane 102
108b exemplary photon representing a local light intensity in the optical plane 101
109 exemplary orientation of the optical system, with the z-axis being identical or parallel to the optical axis (not shown) of the optical system
200 exemplary plot of error of ray shift measurements
201 exemplary error curve
202 exemplary abscissa axis, e.g. y-axis, e.g. ray shift in pixel
203 exemplary ordinate axis, e.g. x-axis, e.g. error of ray shift measurement with normalized scale from 0 to 1
300 exemplary optical system
301 exemplary (first) image at a (first) optical path position
302 exemplary (second) image at a (second) optical path position
303 exemplary possible focal plane
304 exemplary optical element, e.g. lens, of optical system
305 exemplary (first) phase screen
306 exemplary (second) phase screen
307 exemplary (first) object to be observed
308 exemplary (second) object to be observed
309 exemplary light rays (light ray bundle) emanating from (first) object
310 exemplary light rays (light ray bundle) emanating from (second) object
311 exemplary (first) section or region of (first) image 301
312 exemplary (first) section or region of (second) image 302
313 exemplary (second) section or region of (second) image 302
314 exemplary (second) section or region of (first) image 301
315 exemplary optical axis
316 exemplary (first) optical plane or (first) measurement plane
317 exemplary (second) optical plane or (second) measurement plane
318 exemplary at least partially transparent target (media) volume

The invention claimed is:

1. A method for performing a two-dimensional reconstruction of wave fronts of light for use in an optical system comprising:
    measuring a distribution function of light intensity in at least two pixelated images, the at least two pixelated images captured at two or more optical planes, the two or more optical planes having an optical path difference;
        wherein measuring the distribution function of the light intensity comprises determining a plurality of one-dimensional cumulative distribution functions of the light intensity in each plane over a range of different angles within each plane;
    matching the determined plurality of one-dimensional cumulative distribution functions across the two or more optical planes to derive two-dimensional wave front slope estimates in a midway plane, wherein the midway plane is located between the two or more optical planes; and
    integrating the two-dimensional wave front slope estimates to reconstruct a two-dimensional shape of the wave front in the midway plane,
    wherein the distribution function of light intensity is associated with a wave front.

2. The method of claim 1, wherein one of the at least two pixelated images is taken in a pupil plane of the optical system.

3. The method of claim 1, wherein one pixelated image of the at least two pixelated images is taken intra-focally and at least one image of the at least two pixelated images is taken extra-focally.

4. The method of claim 1, further comprising reconstructing a plurality of two-dimensional wave front shapes in a plurality of optical planes based on the at least two pixelated images.

5. The method of claim 1, further comprising:
dividing each pixelated image of the at least two pixelated images into sections; and
for each section, reconstructing a two-dimensional shape of the wave front.

6. The method of claim 1, wherein propagation of a recovered wave front is determined according to Rayleigh-Sommerfeld diffraction.

7. The method of claim 1, wherein one of the at least two images is a computed image that is fully characterized by theoretical or empirical models.

8. A system, comprising:
a processor; and
a non-transitory memory containing instructions, which when executed by the processor, cause the system to:
measure a distribution function of light intensity in at least two pixelated images, the at least two pixelated images captured at two or more optical planes, the two or more optical planes having an optical path difference,
wherein measuring the distribution function of the light intensity comprises determining a plurality of one-dimensional cumulative distribution functions of the light intensity in each plane over a range of different angles within each plane,
match the determined plurality of one-dimensional cumulative distribution functions across the two or more optical planes to derive two-dimensional wave front slope estimates in a midway plane, wherein the midway plane is located between the two or more optical planes, and
integrate the two-dimensional wave front slope estimates to reconstruct a two-dimensional shape of the wave front in the midway plane,
wherein the distribution function of the light intensity is associated with a wave front.

9. The system of claim 8, wherein the processor is a graphical processor unit (GPU).

10. The system of claim 8, further comprising an image detector, wherein the at least two pixelated images are captured by the image detector.

11. The system of claim 10, wherein the memory contains instructions, which when executed by the processor, cause the system to perform a tomography of a volumetric distribution of the wave front based on the at least two pixelated images.

12. The system of claim 11, further comprising a wave front sensor,
wherein the memory further contains instructions, which when executed by the processor, cause the system to perform a wave-front reconstruction based on data from the wave front sensor.

13. The system of claim 12, wherein the memory contains instructions, which when executed by the processor, cause the system to perform a tomography of a three-dimensional distribution of the wave front based on data from the wave front sensor.

14. The system of claim 12, wherein the wave-front sensor is one or more of a curvature sensor or an optical acquisition system.

15. A non-transitory, computer-readable medium comprising program code, which when executed by a processor, causes a system to:
measure a distribution function of light intensity in at least two pixelated images, the at least two pixelated images captured at two or more optical planes, the two or more optical planes having an optical path difference,
wherein measuring the distribution function of the light intensity comprises determining a plurality of one-dimensional cumulative distribution functions of the light intensity in each plane over a range of different angles within each plane,
match the determined plurality of one-dimensional cumulative distributions functions across the two or more optical planes to derive two-dimensional wave front slope estimates in a midway plane, wherein the midway plane is located between the two or more optical planes, and
integrate the two-dimensional wave front slope estimates to reconstruct a two-dimensional shape of the wave front in the midway plane,
wherein the distribution function of the light intensity is associated with a wave front.

16. The non-transitory, computer-readable medium of claim 15, further comprising instructions, which when executed by the processor, cause the system to perform a tomography of a volumetric distribution of the wave front based on the at least two pixelated images.

17. The non-transitory, computer-readable medium of claim 15, further comprising instructions, which when executed by the processor, cause the system to perform a wave-front reconstruction based on data from a wave front sensor.

18. The non-transitory, computer-readable medium of claim 15, further comprising instructions, which when executed by the processor, cause the system to perform a tomography of a three-dimensional distribution of the wave front based on data from a wave front sensor.

* * * * *